United States Patent
Paltashev et al.

(10) Patent No.: US 10,032,308 B2
(45) Date of Patent: Jul. 24, 2018

(54) CULLING OBJECTS FROM A 3-D GRAPHICS PIPELINE USING HIERARCHICAL Z BUFFERS

(71) Applicant: Advanced Micro Devices, Inc., Sunnyvale, CA (US)

(72) Inventors: Timour T. Paltashev, Sunnyvale, CA (US); Chris Brennan, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/189,656

(22) Filed: Jun. 22, 2016

(65) Prior Publication Data
US 2017/0372509 A1    Dec. 28, 2017

(51) Int. Cl.
| | | |
|---|---|---|
| *G06T 15/40* | (2011.01) | |
| *G06T 15/00* | (2011.01) | |
| *G06T 15/80* | (2011.01) | |
| *G06T 17/20* | (2006.01) | |

(52) U.S. Cl.
CPC .......... *G06T 15/405* (2013.01); *G06T 15/005* (2013.01); *G06T 15/80* (2013.01); *G06T 17/205* (2013.01)

(58) Field of Classification Search
CPC ............................. G06T 15/40; G06T 15/405
See application file for complete search history.

(56) References Cited

U.S. PATENT DOCUMENTS

| | | | | |
|---|---|---|---|---|
| 6,646,639 B1* | 11/2003 | Greene | ................. | G06T 15/405 345/422 |
| 7,382,368 B1* | 6/2008 | Molnar | ..................... | G06T 9/00 345/418 |
| 2003/0122850 A1* | 7/2003 | Koneru | ................. | G06T 15/005 345/620 |
| 2013/0120380 A1* | 5/2013 | Kallio | ................... | G06T 15/005 345/421 |
| 2014/0176544 A1* | 6/2014 | Fishwick | ................ | G06T 15/40 345/423 |
| 2015/0042650 A1* | 2/2015 | Kim | ...................... | G06T 15/005 345/423 |
| 2016/0086299 A1* | 3/2016 | Sharma | ................. | G06T 15/405 345/422 |
| 2017/0024926 A1* | 1/2017 | Duvvuru | ............... | G06T 15/005 |

OTHER PUBLICATIONS

Nießner, Matthias, and Charles Loop. "Patch-based occlusion culling for hardware tessellation." Computer Graphics International. vol. 2. 2012.*
Hall et al., "EXT_primitive_bounding_box", <https://www.khronos.org/registry/gles/extensions/EXT/EXT_primitive_bounding_box.txt>, Accessed Sep. 20, 2016, 7 pages.

(Continued)

*Primary Examiner* — Daniel Hajnik (57) ABSTRACT

A shader in a graphics pipeline accesses an object that represents a portion of a model of a scene in object space and one or more far-z values that indicate a furthest distance of a previously rendered portion of one or more tiles from a viewpoint used to render the scene on a screen. The one or more tiles overlap a bounding box of the object in a plane of the screen. The shader culls the object from the graphics pipeline in response to the one or more far-z values being smaller than a near-z value that represents a closest distance of a portion of the object to the viewpoint.

16 Claims, 7 Drawing Sheets

(56) References Cited

OTHER PUBLICATIONS

Boulos et al., "Space-Time Hierarchical Occlusion Culling for Micropolygon Rendering with Motion Blur", High Performance Graphics, Jun. 25, 2010, 8 pages.
Zhang et al., "Visibility Culling Using Hierarchical Occlusion Maps", SIGGRAPH '97 Conf. Proc. Ann. Conf. Series, Aug. 1, 1997, 26 pages.
Rákos, "Hierarchical-Z map based occlusion culling", <http://rastergrid.com/blog/2010/10/hierarchical-z-map-based-occlusion-culling>, Accessed Sep. 20, 2016, 7 pages.
Haines et al., "Occlusion Culling Algorithms", <http://www.gamasutra.com/view/feature/3394/occlusion_culling_algorithms.php?print=1>, Accessed Jun. 17, 2016, 10 pages.
Zhang, "Effective Occlusion Culling for the Interactive Display of Arbitrary Models", PhD Thesis, Computer Science Dept., UNC Chapel Hill, 1998, 109 pages.
Loop et al., "Real-time patch-based sort-middle rendering on massively parallel hardware" Microsoft Research tech. rep., MSR-TR-2009-83, May 1, 2009, 21 pages.
Seiler et al., "Larrabee: A Many-Core x86 Architecture for Visual Computing", ACM Transactions on Graphics, vol. 27, No. 3, Article 18, Aug. 1, 2008, 16 pages.
Bilodeau, "Direct3D 11 Tutorial Tessellation", Direct 3D In-Depth Tutorial: Tessellation, AMD, <http://www.gdcvault.com/play/1012740/direct3d>, Mar. 31, 2010, 57 pages.
Luebke, "Visibility Culling III: Image-Space Occlusion", Computer Science Dept., University of Virginia, <http://www.slideserve.com/ruana/visibility-culling-iii-image-space-occlusion>, Accessed Mar. 3, 2016, 30 pages.

\* cited by examiner

CULLING OBJECTS FROM A 3-D GRAPHICS PIPELINE USING HIERARCHICAL Z BUFFERS

BACKGROUND

Description of the Related Art

A conventional graphics pipeline for processing three-dimensional (3-D) graphics may be divided into a portion that handles geometry workloads and a portion that handles pixel workloads. The portion that handles the geometry workload may be referred to as operating in "object space" and the portion that handles the pixel workloads may be referred to as operating in "image space." A 3-D model of the objects in a scene may be represented by a set of patches (such as Bezier patches) that are high-order surfaces defined by a set of control points. The model of the objects in a scene may also be represented by as a set of primitives, such as polygons formed of interconnected vertices. For example, common objects like meshes include triangles formed of three vertices. Triangles, lines, points, and the like are referred to as low-order primitives. Geometry workloads include generating lower-order primitives from higher-order surfaces such as input patches (e.g., by tessellation of the higher-order surface), subdividing input primitives into a set of output primitives to represent finer levels of detail, shading and texturing the vertices of the primitives, and the like.

The geometry portion of the graphics pipeline may therefore include a geometry front-end that processes high-order primitives, a tessellator that receives the high-order primitives and generates lower-order primitives from the input higher-order primitives, and a geometry back-end that processes the low-order primitives. The geometry front-end may be implemented using a vertex shader and a hull shader that operates on the patches. The geometry back-end may include a geometry shader to subdivide or replicate primitives with variable parameters (e.g for processes such as hair or fur generation). In some cases, additional vertex shading may be performed on the vertices of the primitives output by the geometry shader. Vertices of the primitives generated by the portion of the graphics pipeline that handles the geometry workload in object space are then provided to the portion that handles pixel workloads in image space, e.g., via primitive, vertex, and index buffers. The pixel workload includes rasterization of the primitives to generate fragments or pixels from the input geometry primitives and shading of the fragments using applicable textures. The fragments may be individual pixels or subpixels in some cases. The conventional graphics pipeline includes a pixel shader to perform the shading.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The pixel workload is reduced by clipping or culling primitives (in object space or image space) or rasterized fragments associated with hidden surfaces that are not visible from the perspective view used to render the image of the 3-D model on the screen. The perspective is defined by a "virtual camera" that represents a user's point of view. Frustum culling is used to remove primitives and fragments that are outside the volume that is visible to the virtual camera. Backface culling is used to remove primitives that represent a side, or face, of a surface that is oriented away from the virtual camera.

Occlusion culling is used to remove primitives or rasterized fragments that are obscured by opaque objects that intervene between the primitive or rasterized fragment and the virtual camera. For example, the rasterized fragments that represent the image of the 3-D model can be projected into screen space and gathered into groups of tiles that each represent a portion of the screen space, such as an 8×8 group of tiles. The 3-D position of each rasterized fragment is represented by coordinates (x, y, z) of a pixel or ranges of coordinates when the fragment includes more than one pixel. The coordinate system is oriented so that the distance of the fragment from the virtual camera is represented by the z coordinate. A buffer, which is referred to as a hierarchical Z buffer or "HiZ" buffer, stores values of the z coordinate range for hierarchically ordered groups of tiles. In some implementations, the values include a pair of values: (near-Z, far-Z). For example, in some implementations, different levels in the hierarchical buffer include 2×2 groups of tiles, 4×4 groups of tiles that encompass the 2×2 groups of tiles, and an 8×8 group of tiles that encompasses the 4×4 groups of tiles. The stored value for each group of tiles represents the z coordinate range of the previously rendered fragment in the group of tiles that is furthest from the virtual camera. In some implementations, the z coordinate range of the fragment is compared to the value of the z coordinate range stored in the hierarchical buffer for a group of tiles that overlaps the fragment. In some cases, the fragment is culled if the z coordinate of the fragment is larger than the value of the z coordinate stored in the hierarchical buffer, which indicates that the fragment is obscured by a previously rendered object. As used herein, the terms "cull," "culling," "culled," and the like refer to the process of removing or dropping an object from the graphics pipeline so that the object is not provided to any downstream entities in the graphics pipeline and no further processing is performed on the culled object by the downstream entities.

The geometric workload in many modern applications has increased relative to the pixel workload, e.g., in response to increases in image fidelity that require processing significantly larger quantities of smaller size primitives. The shift in the workload from pixels to geometry is due to many factors. The level of geometric detail used to represent models of scenes has been increasing, which skews the rendering workload percentages away from the pixel workload and towards the geometric workload. Tessellation is now used to increase geometric detail in the images and more complex geometric animation techniques are being developed. Deferred rendering engines can also spend a large fraction of frame time rendering a geometry buffer that includes geometric animation or transformation work. Consequently, optimizations to the pixel portion of the graphics pipeline, such as occlusion culling of fragments based on the hierarchical buffer, are becoming less effective means for improving the performance of the graphics pipeline because the overall workload is more likely to be bottlenecked in the geometry portion of the graphics pipeline. For example, the increased level of geometric detail can result in the geometry portion of the graphics pipeline emitting primitives to the pixel portion of the pipeline that represent a small number of pixels or even a single pixel. Performing occlusion culling on the small number pixels associated with each primitive provides minimal performance improvements in these circumstances.

Primitives and other higher-order objects such as patches are culled in the geometry front-end or back-end of the graphics pipeline so that occluded objects are not emitted to the geometry back-end or pixel portion of the graphics pipeline, respectively, thereby reducing the pixel workload. For example, occlusion culling can be performed on patches that are input to a geometry front-end shader. Patches that survive the occlusion culling are then emitted to another shader or a subsequent tessellation engine, which generates primitives from the patches. Occlusion culling in the geometry front-end significantly reduces the workload for subsequent stages of the graphics pipeline. For another example, occlusion culling can be performed on lower-order primitives in the geometry back-end. Primitives that survive the occlusion culling are then emitted to a geometry shader, which may subdivide each of the surviving primitives into multiple primitives with finer granularity. For yet another example, occlusion culling can be performed on primitives produced by the geometry shader that have a size in the pixel or subpixel range. The surviving primitives may then be provided to the pixel portion of the graphics pipeline.

Occlusion culling is performed by comparing dimensions of an input object (such as a patch or primitive) to buffered values that indicate the most distant portion of a previously rendered object. In some implementations, a shader receives the input object and generates a bounding box that encompasses a 3-D perspective projection of the object in screen space and a near-z value that indicates the z coordinate of the input object that is closest to a viewpoint used to generate an image on the screen. The shader selects one or more tiles that encompass the bounding box. Each of the tiles is associated with a far-z value that indicates the z coordinate of a previously rendered portion of the tile that is furthest from the viewpoint. The shader compares the near-z value of the input object with the far-z values of the one or more tiles covering the object projection. The input object is culled if the near-z value is larger than one or more of the far-z values, which indicates that the input object is obscured by a portion of a previously rendered object. In some implementations, the far-z values are stored in a hierarchical buffer that includes multiple levels. Higher levels have coarser granularity so that each tile in a higher level encompasses a predetermined number (such as 4) of tiles in the next lower level. The far-z value for each higher level tile is equal to the maximum of the far-z values of the encompassed lower level tiles. Some implementations of the shader select a level of the hierarchical buffer for comparison with the input object based on a length scale (in screen space) of the input object.

Figure 1:
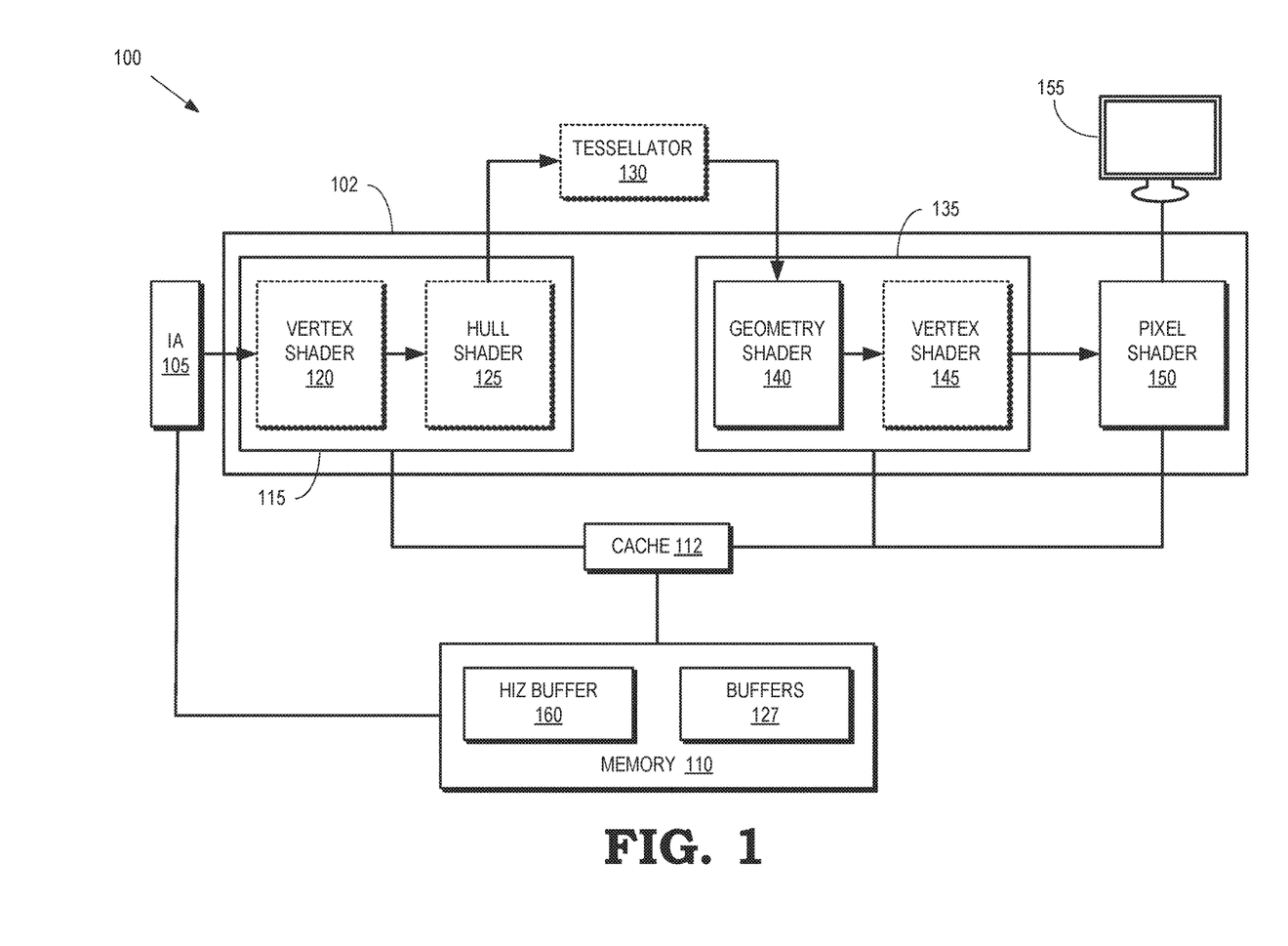
FIG. 1 is a block diagram of a graphics processing system according to some implementations.

FIG. 1 is a block diagram of an example graphics processing system 100 according to some implementations. The graphics processing system 100 includes an input assembler (IA) 105 that accesses information used to define objects that represent portions of a model of a scene. For example, the input assembler 105 can access Bezier patches that are defined by one or more control points and used to represent portions of the model. For another example, the input assembler 105 can access vertices of primitives such as triangles representative of portions of the model. In some implementations, the input assembler can also create work items for a graphics pipeline in the graphics processing system 100 and assign identifiers to the objects such as vertex identifiers, primitive identifiers, control point identifiers, and the like. In some variations, the objects can be accessed from a memory 110 in the graphics processing system 100. Some implementations of the processing system 100 include a cache 112 that is used to cache information stored in the memory 110. In some cases, the cache 112 is a single level cache or a hierarchical cache that includes multiple levels such as an L1 cache, an L2 cache, an L3 cache, and the like.

The graphics pipeline 102 in the example graphics processing system 100 includes a geometry front-end 115 that processes patches received from the input assembler 105. The geometry front-end operates in object space. Some implementations of the geometry front-end 115 include one or both of a vertex shader 120 for performing shading operations on vertices received from the input assembler 105 and a hull shader 125 that operates on patches (or the control points of patches) received from the input assembler 105. In some variations, the hull shader 125 can also generate and output tessellation factors that are used for tessellating the patches, as well as other patch parameters or constants. In some implementations, the output patches, control points, tessellation factors and the like can be provided to one or more buffers 127, such as primitive buffers, index buffers, vertex buffers, and the like. In some implementations, the vertex shader 120 or the hull shader 125 are implemented as software running on one or more hardware components such as processors, processor cores, compute units, and the like. Some implementations of the geometry front-end 115 can include other shaders or different combinations of shaders that are used to perform similar functionality to the vertex shader 120 and the hull shader 125.

In some variations, the graphics pipeline 102 can further include a tesselator 130. When present, the tessellator 130 in the graphics pipeline 102 receives objects (such as patches) from the geometry front-end 115 and generates information identifying primitives corresponding to the input object, e.g., by tessellating the input objects. For example, tessellating an input patch can include generating domain locations and topology such as points, lines, or triangles that represent the input patch. The tessellator 130 therefore operates in object space. In variations, the tessellator 130 accesses information from the buffers 127 and provides output to the buffers 127.

Some implementations of the tessellator 130 are implemented as fixed function hardware that is configured to perform the tessellation.

The graphics pipeline 102 also includes a geometry back-end 135 that processes primitives that are received from the geometry front-end 115 or, when present, tessellator 130. The geometry back-end 135 therefore operates in object space. The geometry back-end 135 includes a geometry shader 140 that performs operations on the input primitives such as subdividing the input primitives into one or more smaller primitives, e.g., to represent finer levels of detail in the rendered image. Some implementations of the geometry back-end 135 include an additional vertex shader 145 that is used to shade the vertices of the primitives (or subdivided primitives) produced by the geometry shader 140. In variations, the geometry shader 140 or the vertex shader 145 is implemented as software running on one or more hardware components such as processors, processor cores, compute units, and the like. In some implementations, the geometry back-end 135 provides output to the buffers 127 and access information stored in the buffers 127. Some implementations of the geometry back-end 135 can include other shaders or different combinations of shaders that are used to perform similar functionality to the geometry shader 140 and the vertex shader 145.

A pixel shader 150 in the graphics pipeline 102 shades pixels or rasterized fragments (e.g., a piece of a primitive mapped into screen space) based on the primitives or fragments from the geometry back-end 135. The pixel shader 150 therefore operates in rasterized image space. Shading the pixels or rasterized primitives includes operations such as interpolating values representative of the color or brightness at the pixel from corresponding values defined at vertices of the corresponding primitive, which are combined with textures or other data according to one or more algorithms implemented by the shader. The shaded pixels or fragments are then be provided to a screen 155 for display to a user.

In the present example implementation, each shaded pixel or fragment is associated with a depth value that indicates a distance (from a virtual camera that represents a viewer's perspective) of the portion of the model used to render the image in the pixel or fragment. For example, the 3-D position of each rasterized fragment or pixel is represented by coordinates (x, y, z) of a pixel or ranges of coordinates when the fragment includes more than one pixel. The coordinate system is oriented so that the distance of the fragment or pixel from the virtual camera is represented by the z coordinate. The distances can also be referred to as "depths." Larger depth values indicate that the portion of the model that corresponds to the pixel or fragment is further from the viewpoint of the virtual camera. The fragments or pixels that represent the image of the 3-D model can be projected into screen space and gathered into groups of tiles that each represent a portion of the screen space, such as an 8×8 group of tiles. Depth values can also be associated with tiles or groups of tiles, as discussed herein.

A hierarchical-Z (HiZ) buffer 160 is used to store values that indicate distances associated with portions of the screen space. Some implementations of the hierarchical buffer 160 store values of the z coordinate range for hierarchically ordered groups of tiles as a pair of values: (near-Z, far-Z). For example, different levels in the hierarchical buffer 160 can include 2×2 groups of tiles, 4×4 groups of tiles that encompass the 2×2 groups of tiles, and an 8×8 group of tiles that encompasses the 4×4 groups of tiles. The stored far-z value for each group of tiles represents the z coordinate of the previously rendered pixels or fragments that are furthest from the virtual camera. The stored near-z value for each group of tiles represents the z coordinate of the previously rendered pixels or fragments that are closest to the virtual camera. The z coordinate range of an object can be compared to the value of the z coordinate range stored in the hierarchical buffer 160 for a group of tiles that overlaps the object. The comparison indicates whether the object is in front of, behind, or in the same depth range as the previously rendered pixels or fragments.

Some embodiments of the hierarchical buffer 160 are "watertight," which means that the hierarchical buffer 160 does not have any far-z values that are larger than the z-coordinate of the most distant sample in the corresponding tile. A watertight hierarchical buffer 160 therefore does not have any information that "leaks" into an entry associated with a tile or group of tiles from abutting geometry. The range represented by the pair of values (near-Z, far-Z) can be filtered and used to support shader operations that use a single instruction to test a bounding box of an object such as a patch, primitive, fragment, or pixel against entries in the hierarchical buffer 160 to determine whether the object overlaps one or more tiles. In some implementations, mipmap chains are generated to represent the hierarchy of groups of tiles. The mipmap chain includes a predetermined number of levels with a range of granularity that corresponds to geometry scales of the objects. In some implementations, values in the hierarchical buffer 160 are updated using feedback from the graphics pipeline. For example, the hierarchical buffer 160 can be updated using z-values of rendered objects in response to completion of geometry workloads such as geometry workloads that include a high number of primitives. For another example, the hierarchical buffer 160 can be updated in response to flushing one or more lines in the cache 112. Atomic min and max operations can be used to update the hierarchical buffer 160 from one or more buffers.

Shaders perform occlusion culling to remove objects that represent portions of the model that are obscured by other portions of the model such as opaque objects that intervene between the virtual camera and the fragment or pixel. For example, a shader in a geometry portion of the graphics pipeline, such as the hull shader 125 in the geometry front-end 115, can access information representing an object such as a patch that represents a portion of a model of a scene in object space. The patch information is accessed from the cache 112, the buffers 127, or other storage locations. The shader also accesses the hierarchical buffer 160 or cache 112 to retrieve one or more far-z values that indicate a furthest distance of a previously rendered portion of one or more tiles that overlaps the patch in screen space. The shader culls the patch from the graphics pipeline in response to the one or more far-z values being smaller than a near-z value that represents a closest distance of a portion of the patch to the viewpoint, which indicates that the patch is obscured by the previously rendered object in the overlapping tiles. For another example, a shader in the geometry back-end 135, such as the geometry shader 140, can cull one or more primitives received from the tessellator 130 by comparing the near-z values of the primitives with far-z values of overlapping tiles stored in the hierarchical buffer 160. For yet another example, occlusion culling can be performed on primitives produced by the geometry shader 140 that have a size in the pixel or subpixel range. The surviving primitives are provided to the pixel shader 150.

Figure 2:
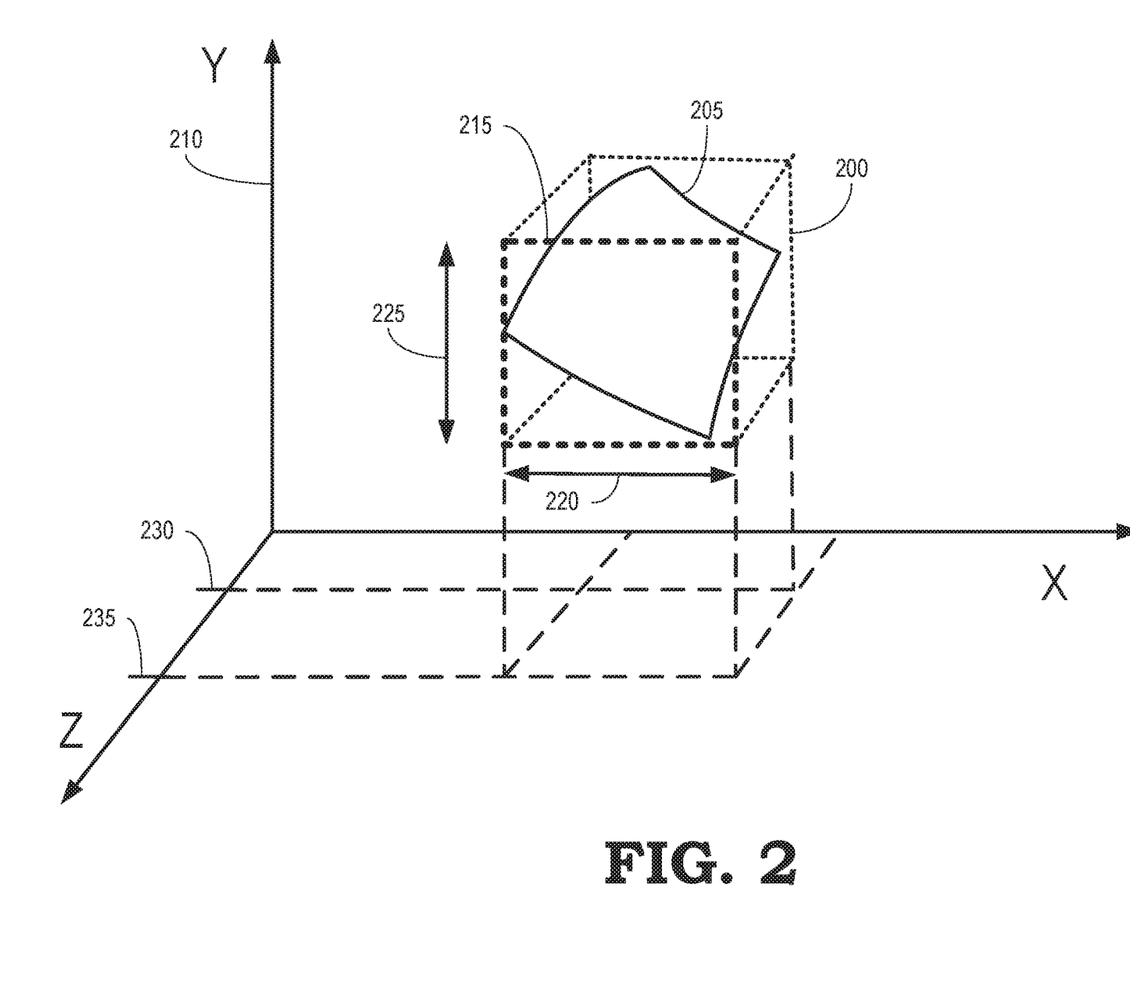
FIG. 2 is a diagram of a bounding volume that is used to determine a bounding box and depth values for an object according to some implementations.

FIG. 2 is a diagram of an example bounding volume 200 that is used to determine a bounding box and depth values for an object 205 according to some implementations. For example, the bounding volume 200 determines a bounding box and depth values for an object 205 such as a patch that is processed in the geometry front-end 115 shown in FIG. 1 or a primitive that is processed by the geometry back-end 135 shown in FIG. 1. The bounding volume 200 is depicted in a coordinate system 210 that is oriented so that the X-coordinate and the Y-coordinate are in the plane of a screen that is used to display the rendered image of the object 205. The Z-coordinate of the coordinate system 210 is oriented to indicate distance from a viewpoint of a virtual camera that is used to render the image of the object 205. In some implementations, the origin of the coordinate system 210 corresponds to a location of the virtual camera.

A bounding box 215 (indicated by the bold, dotted lines) is defined by a range 220 of X-coordinates spanned by the projection of the object 205 into the X-Y plane of the screen and a range 225 of Y-coordinates spanned by the projection of the object 205 into the X-Y plane of the screen. The depth values for the object 205 include a near-z value 230 that represents the Z-coordinate of the portion of the object 205 that is closest to the viewpoint of the virtual camera and a far-z value 235 that represents the Z-coordinate of the portion of the object 205 that is furthest from the viewpoint of the virtual camera. As discussed herein, the bounding box 215, the near-z value 230, and the far-z value 235 can be used to perform occlusion culling of the object 205.

Figure 3:
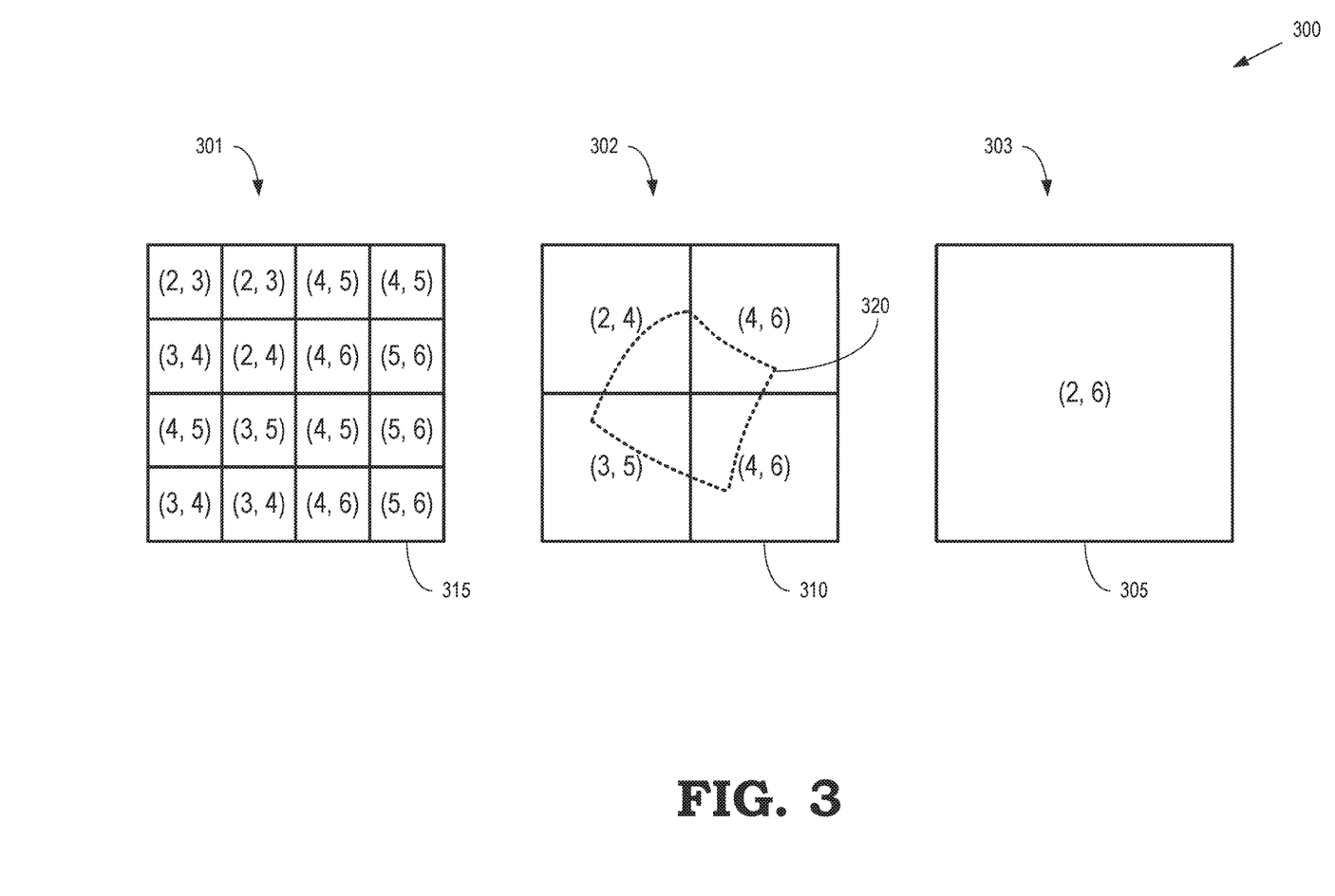
FIG. 3 illustrates a hierarchical buffer that is used to store pairs of near-z and far-z values of tiles associated with previously rendered portions of a scene according to some implementations.

FIG. 3 illustrates an example hierarchical buffer 300 that is used to store pairs of near-z and far-z values of tiles associated with previously rendered portions of a scene according to some implementations. The hierarchical buffer 300 is used to implement some implementations of the hierarchical buffer 160 shown in FIG. 1. The hierarchical buffer 300 includes three levels 301, 302, 303 that are referred to collectively as "the levels 301-303." Each of the levels 301-303 represents the same region of a screen used to display the rendered images. Each of the levels 301-303 includes entries for tiles at different levels of resolution and each tile represents a portion of the screen. In some implementations, tiles in a higher level of the hierarchical buffer 300 encompass a predetermined number of tiles in the next lower level of the hierarchical buffer 300. For example, the tile 305 in the level 303 encompasses four of the tiles 310 (only one indicated by a reference numeral in the interest of clarity) in the level 302. For another example, each of the tiles 310 in the level 302 encompasses four of the tiles 315 (only one indicated by a reference numeral in the interest of clarity) in the level 301.

The entries corresponding to the tiles 305, 310, 315 include information indicating near-z and far-z values that are determined based on previously rendered objects or portions of a scene. For example, if an object that was rendered in the portion of the screen corresponding to the tile 315 has a near-z value of 5 and a far-z value of 6, the corresponding entry includes the pair (5, 6). In some implementations, the entries represent the near-z and far-z values that encompass multiple objects that are rendered in the tile 315. Entries associated with each tile in higher levels of the hierarchical buffer 300 have near-z and far-z values that span the range indicated by the tiles in the lower levels that are encompassed by the tile in the higher level. For example, the tile 310 in the level 302 encompasses four tiles 315 in the level 301. If the near-z and far-z values for the four tiles 315 are (4, 5), (5, 6), (4, 6), and (5, 6), then the near-z and far-z values for the corresponding tile 310 are (4, 6).

In some implementations, one of the levels 301-303 in the hierarchical buffer 300 is selected by comparing dimensions of an object 320 in the plane of the screen to dimensions of the tile 305, 310, 315 in the different levels 301-303. For example, the level 302 can be selected by a comparison of the dimensions of the object 320 with the dimensions of the tile 310 because the comparison indicates that the dimensions of the object 320 and the tile 310 are within a selected tolerance of each other. Other criteria may also be used to select the levels 301-303. For example, the level 302 may be selected because the object 320 overlaps with no more than four of the tiles 310, regardless of the relative positions of the object 320 and the tiles 310 in the plane of the screen. In contrast, the object 320 would overlap more than four of the tiles 315 in the level 301, which indicates that the granularity of the level 301 is finer than optimal for the object 320, and the object 320 would be completely encompassed by the tile 305 in the level 303, which indicates that the granularity of the level 303 is coarser than optimal for the object 320. The near-z and far-z values in the tiles of the selected level can be used to perform occlusion culling on the object 320, as discussed herein.

Figure 4:
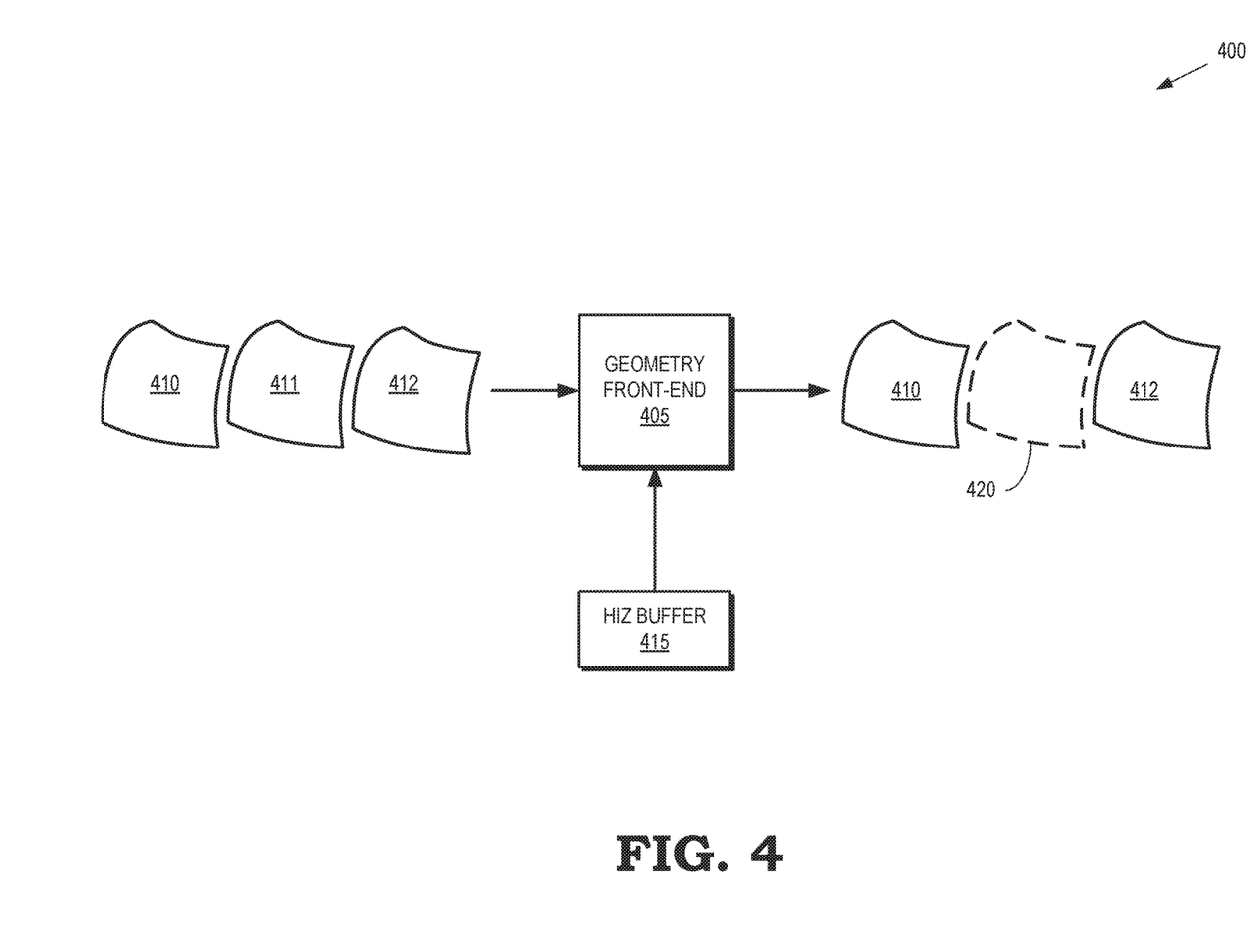
FIG. 4 is a block diagram of a portion of a graphics processing system that performs occlusion culling of objects in a geometry front-end according to some implementations.

FIG. 4 is a block diagram of a portion 400 of an example graphics processing system that performs occlusion culling of objects in a geometry front-end 405 according to some implementations. The geometry front-end 405 is used in some implementations of the geometry front-end 115 shown in FIG. 1. Some implementations of the geometry front-end 405 optionally or selectively perform occlusion culling on high-order objects such as patches received from an input assembler such as the input assembler 105 shown in FIG. 1. Occlusion culling can be selectively or optionally performed based on a hint mechanism exposed to an application, a heuristic that indicates whether to perform occlusion culling, or a shader detection algorithm that determines an indication of whether to perform occlusion culling.

The geometry front-end 405 receives a stream of objects such as patches 410, 411, 412, which are collectively referred to as "the patches 410-412." The patches 410-412 represent portions of a model of a scene that may be rendered to generate an image for display on a screen. For each of the patches 410-412, the geometry front-end 405 defines a bounding volume that encompasses the patch such as the bounding volume 200 shown in FIG. 2. The bounding volumes for the patches 410-412 are used to define bounding boxes for the patches 410-412 such as the bounding box 215 shown in FIG. 2. The bounding volumes for the patches 410-412 are also used to define near-z and far-z values for the patches 410-412, such as the near-z value 230 and far-z value 235 shown in FIG. 2.

The geometry front-end 405 uses the bounding boxes of the patches 410-412 to identify tiles in the plane of the screen that overlap the patches 410-412. As discussed herein, the tiles can be selected from a level of a hierarchical set of tiles in which the tiles in a higher level encompass a predetermined number of tiles in the next lower level. The geometry front-end 405 accesses a hierarchical buffer 415 that stores near-z and far-z values for the tiles in the different levels of the hierarchy. The near-z and far-z values for tiles that overlap the patches 410-412 are used to determine whether previously rendered portions of the model of the scene occlude the overlapping portions of the patches 410-412.

Some of the patches 410-412 are culled in response to determining that they are occluded by previously rendered portions of the model. For example, the geometry front-end 405 determines that the near-z value of the patch 410 is smaller than the far-z values of any of the overlapping tiles, which indicates that at least a portion of the patch 410 is closer to the viewpoint of a virtual camera used to render the image than at least a portion of the previously rendered images in the overlapping tiles. The patch 410 is therefore not fully occluded by the overlapping tiles and the patch 410 is therefore emitted to the next stage of the geometry pipeline, such as the tessellator 130 shown in FIG. 1. For another example, the geometry front-end 405 determines that the near-z value of the patch 411 is larger than the far-z values of any of the overlapping tiles, which indicates that the entirety of the patch 411 is farther from the viewpoint of the virtual camera than at least a portion of the previously rendered images in the overlapping tiles. The patch 411 is therefore fully occluded by the overlapping tiles. The patch 411 is culled so that it is not emitted to the next stage of the geometry pipeline, as indicated by the dashed box 420. For yet another example, the geometry front-end 405 determines that the near-z value of the patch 412 is larger than the far-z values of some of the overlapping tiles and smaller than the far-z values of some of the overlapping tiles, which indicates that the patch 412 is partially occluded by some of the overlapping tiles. Since the un-occluded portion of the patch 412 could be visible in the image displayed on the screen, the patch 412 is not culled and it is emitted to the next stage of the geometry pipeline.

Figure 5:
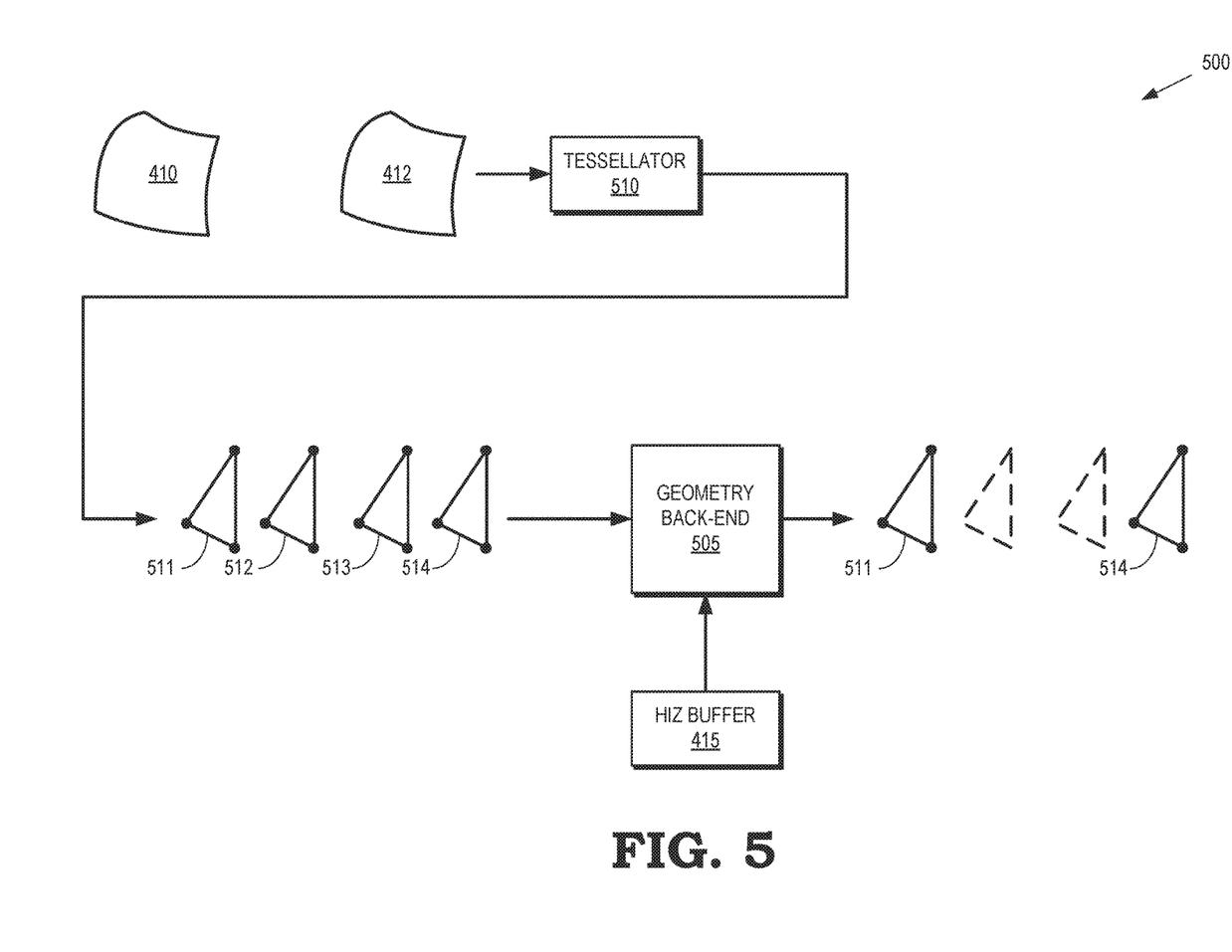
FIG. 5 is a block diagram of a portion of a graphics processing system that performs occlusion culling of objects in a geometry back-end according to some implementations.

FIG. 5 is a block diagram of a portion 500 of an example graphics processing system that performs occlusion culling of objects in a geometry back-end 505 according to some implementations. The geometry back-end 505 is used in some implementations of the geometry back-end 135 shown in FIG. 1. The portion 500 also includes a tessellator 510 such as the tessellator 130 shown in FIG. 1. The tessellator 510 receives a stream of patches such as the patches 410, 412 emitted by the geometry front-end 405 shown in FIG. 4. The tessellator 510 performs tessellation on the patches 410, 412 and generates corresponding polygons such as triangles 511, 512, 513, 514, which are collectively referred to as "the triangles 511-514." The triangles 511-514 are provided to the geometry back-end 505. As discussed herein, some of the patches (such as the patch 411) were culled by the geometry front-end 405, thereby reducing the number of patches that are processed by the tessellator 510 and the number of triangles 511-514 that are processed by the geometry back-end 505, as well as reducing the workload of other downstream portions of the graphics pipeline.

The geometry back-end 505 receives the stream of triangles 511-514 from the tessellator 510. The triangles 511-514 represent portions of the model that correspond to the patches 410, 412. For each of the triangles 511-514, the geometry back-end 505 defines a bounding volume that encompasses the triangle such as the bounding volume 200 shown in FIG. 2. The bounding volumes for the triangles 511-514 are used to define bounding boxes for the triangles 511-514 such as the bounding box 215 shown in FIG. 2. The bounding volumes for the triangles 511-514 are also used to define near-z and far-z values for the triangles 511-514, such as the near-z value 230 and far-z value 235 shown in FIG. 2.

The geometry back-end 505 uses the bounding boxes of the triangles 511-514 to identify tiles in the plane of the screen that overlap the triangles 511-514. As discussed herein, the tiles can be selected from a level of a hierarchical set of tiles in which the tiles in a higher level encompass a predetermined number of tiles in the next lower level. The geometry back-end 505 accesses the hierarchical buffer 415 that stores near-z and far-z values for the tiles in the different levels of the hierarchy. The near-z and far-z values for tiles that overlap the triangles 511-514 are used to determine whether previously rendered portions of the model of the scene occlude the overlapping portions of the 511-514. Some of the triangles 511-514 are culled in response to determining that they are occluded by previously rendered portions of the model. For example, the geometry back-end 505 compares the near-z values of the triangles 511-514 to the far-z values of any of the tile that overlap the triangles 511-514 to determine whether the triangles 511-514 are fully occluded, partially occluded, or not occluded by the previously rendered portions of the model represented in the corresponding tiles, as discussed herein. In the illustrated implementation, the triangles 511 and 514 are either partially occluded or not occluded and so they are emitted to the next stage of the graphics pipeline. The triangles 512, 513 are fully occluded and so they are culled and not emitted to the next stage of the graphics pipeline. Culling the triangles 512, 513 reduces the workload of downstream entities in the graphics pipeline.

Figure 6:
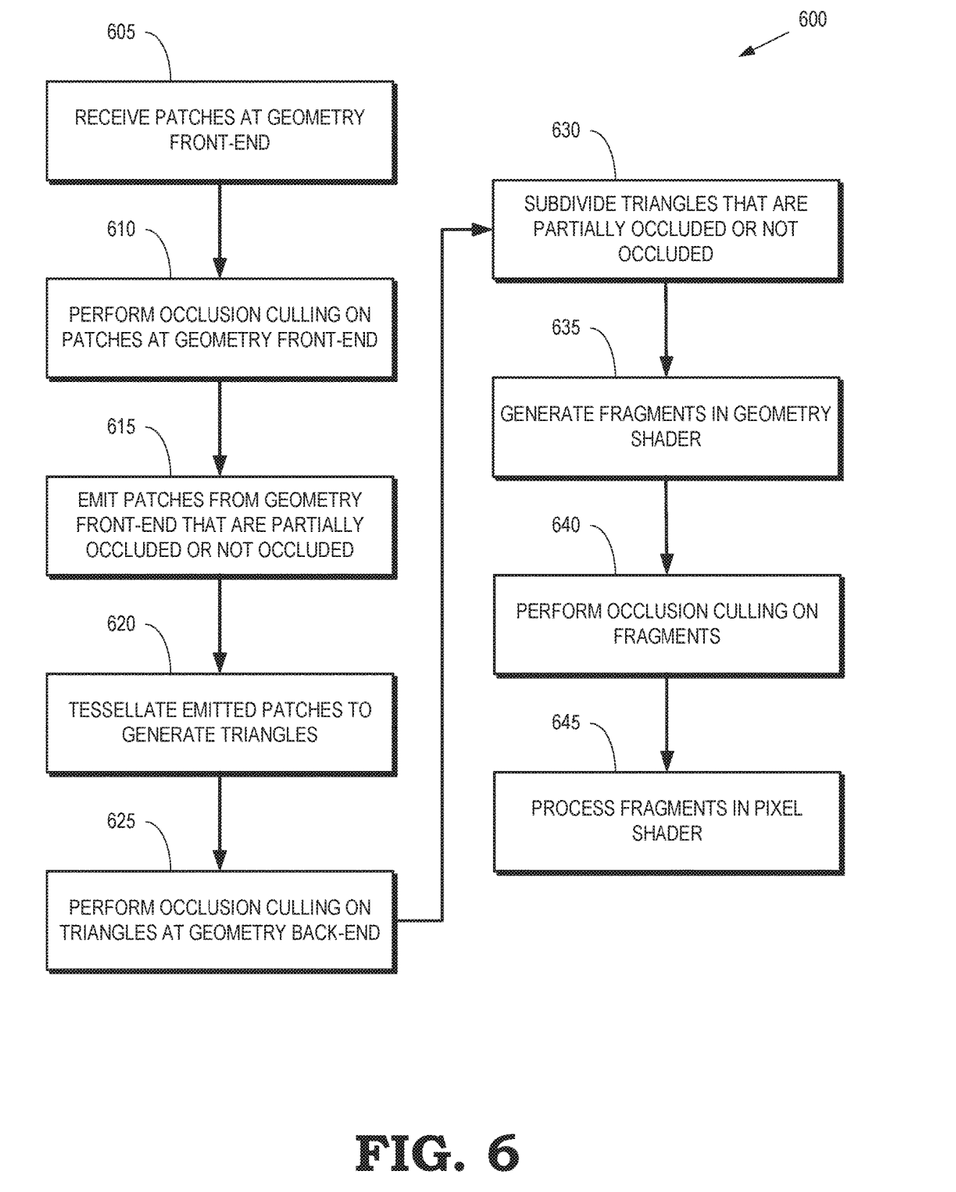
FIG. 6 is a flow diagram of a method of performing occlusion culling in object space according to some implementations.

FIG. 6 is a flow diagram of an example method 600 of performing occlusion culling in object space according to some implementations. The method 600 is used by some implementations of the graphics processing system 100 shown in FIG. 1.

At block 605, a geometry front-end in a graphics pipeline of the graphics processing system receives high-order objects such as patches provided by an input assembler. The geometry front-end includes one or more shaders such as a vertex shader and a hull shader. At block 610, the geometry front-end performs occlusion culling on the patches based on information indicating the far-z values for previously rendered objects in tiles that overlap the patches. The far-z values can be accessed for tiles at a selected level of a hierarchical buffer, as discussed herein. At block 615, the geometry front-end emits patches that are partially occluded or not occluded by previously rendered objects. The emitted patches are provided to a tessellator. Fully occluded patches are culled. In some implementations, the geometry front-end optionally or selectively performs occlusion culling at blocks 610, 615 based on hints, heuristics, or algorithms.

At block 620, a tessellator performs tessellation to generate primitives such as triangles that represent the emitted patches received from the geometry front-end. The triangles are provided to a geometry back-end that includes additional shaders such as a geometry shader.

At block 625, the geometry back-end performs occlusion culling on triangles received from the tessellator. For example, the geometry shader in the geometry back-end can perform occlusion culling on the triangles based on information indicating the far-z values for previously rendered objects in tiles that overlap the triangles. In some implementations, the far-z values are accessed for tiles at a selected level of the hierarchical buffer. At block 630, some implementations of the geometry back-end subdivide the surviving triangles (i.e., triangles that were not culled because they are either not occluded or only partially occluded) to generate one or more smaller triangles that represent the surviving triangles.

At block 635, the geometry shader generates fragments from the surviving triangles or the smaller triangles that were formed by subdividing the surviving triangles. In some implementations, additional occlusion culling is performed at block 640 on the fragments prior to emitting the fragments to the pixel shader for processing in screen space. For example, the geometry shader can generate fragments having a size in the pixel or subpixel range. The geometry shader performs occlusion culling on these relatively small fragments to reduce the number of fragments that are provided to the pixel shader. At block 645, surviving fragments are processed in the pixel shader to generate values of pixels used to produce an image on the screen.

Figure 7:
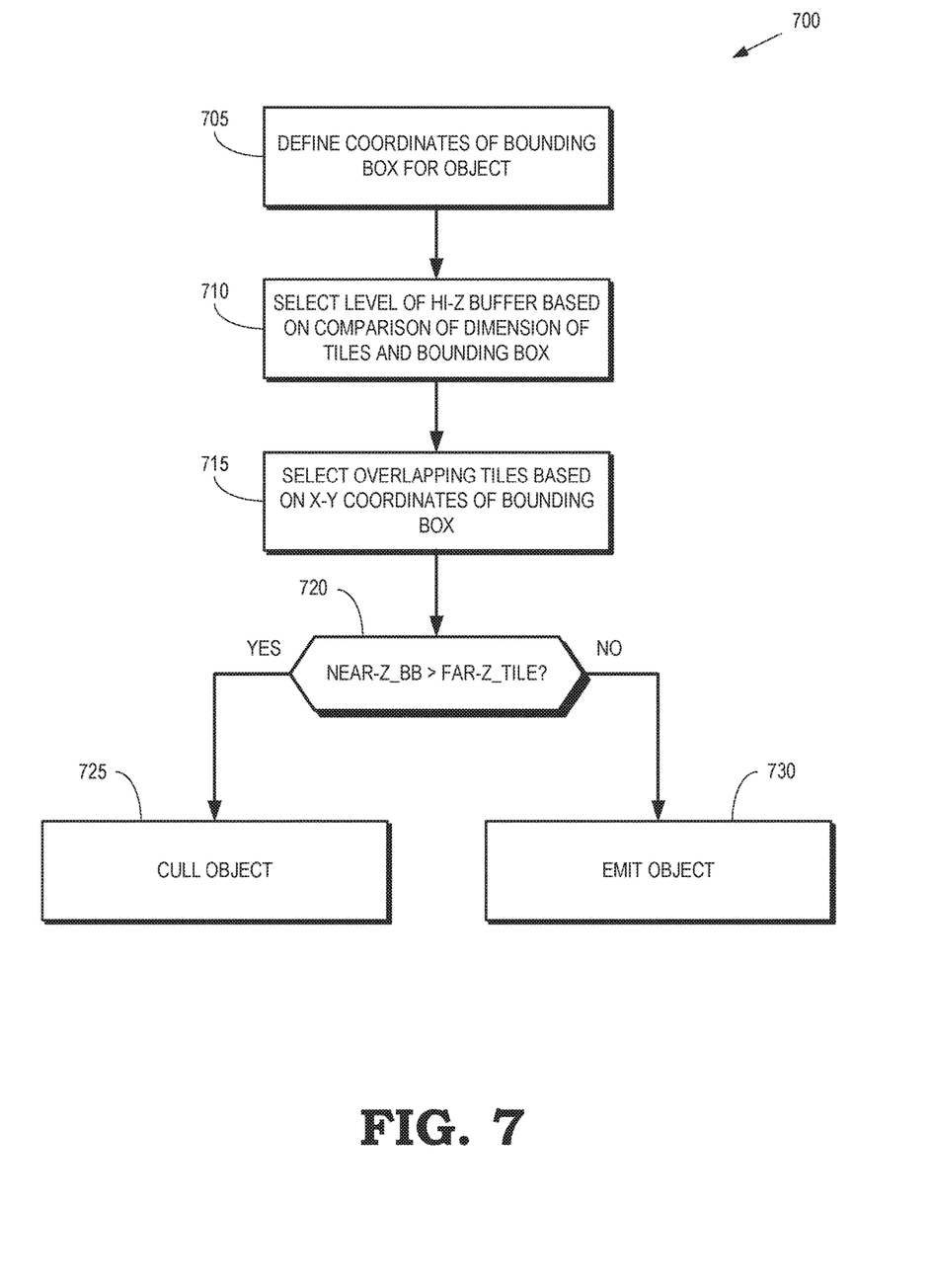
FIG. 7 is a flow diagram of a method of performing occlusion culling on objects such as patches, primitives, or fragments according to some implementations.

FIG. 7 is a flow diagram of an example method 700 of performing occlusion culling on objects such as patches, primitives, or fragments according to some implementations. The method 700 may be implemented a shader such as the shaders included in some implementations of the geometry front-end 115 or the geometry back-end 135 shown in FIG. 1, the geometry front-end 405 shown in FIG. 4, or the geometry back-end 505 shown in FIG. 5.

At block 705, the shader receives an object and defines coordinates of a bounding box for the object in screen space. At block 710, the shader compares dimensions of the bounding box and tiles at different levels of a hierarchical buffer. The shader uses the comparison to select one of the levels of the hierarchical buffer. For example, the shader can select a level of the hierarchical buffer that includes tiles having dimensions comparable to the dimensions of the bounding box so that the bounding box overlaps no more than a predetermined number of tiles in the level.

At block 715, the shader uses the X-Y coordinates of the bounding box to select tiles from the level that overlap with the bounding box of the object. At decision block 720, the shader compares a near-z value for the object to a far-z value of previously rendered object within each of the overlapping tiles. If the near-z value for the object is greater than the far-z value of previously rendered object within all of the overlapping tiles, which indicates that the object is fully occluded by the previously rendered objects within the overlapping tiles, the object is culled at block 725. If the near-z value for the object is less than the far-z value of previously rendered object within at least one of the overlapping tiles, which indicates that the object is either partially occluded or not occluded by the previously rendered objects within the overlapping tiles, the object is emitted to the next stage of the geometry pipeline at block 730.

In some implementations, the apparatus and techniques described above are implemented in a system comprising one or more integrated circuit (IC) devices (also referred to as integrated circuit packages or microchips), such as the graphics processing system described above with reference to FIGS. 1-7. Electronic design automation (EDA) and computer aided design (CAD) software tools can be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium can include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. In some implementations, the computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some implementations, certain aspects of the techniques described above are implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. A method comprising:

accessing, at a geometry portion of a graphics pipeline, an object that represents a portion of a model of a scene in object space;

accessing, at the geometry portion of the graphics pipeline, at least one far-z value that indicates a furthest distance of a previously rendered portion of at least one tile from a viewpoint used to render the scene on a screen, wherein the at least one tile overlaps a bounding box of the object in a plane of the screen;

accessing the at least one far-z value from a hierarchical buffer that stores the far-z and near-z values for tiles in a hierarchy of levels, wherein tiles in a higher level of the hierarchical buffer encompass a predetermined number of tiles in the next lower level of the hierarchical buffer, and wherein the far-z value of a tile in the higher level of the hierarchical buffer is equal to a largest far-z value of a plurality of far-z values of the predetermined number of tiles in the next lower level of the hierarchical buffer that are encompassed by the tile and wherein at least one level in the hierarchical buffer has a granularity resolution corresponding to one pixel per tile;

selecting a target level of the levels in the hierarchical buffer based on a comparison of dimensions of the tiles in the target level and dimensions of the bounding box, and wherein accessing the at least one far-z value comprises accessing at least one far-z value of at least one of the tiles in the target level that overlap the bounding box: and culling, at the geometry portion of the graphics pipeline, the object from the graphics pipeline in response to the at least one far-z value being smaller than a near-z value that represents a closest distance of a portion of the object to the viewpoint.

2. The method of claim 1, wherein accessing the object comprises accessing a patch at a geometry front-end shader, and wherein culling the object comprises culling the patch so that the patch is not emitted to a tessellation engine in the graphics pipeline.

3. The method of claim 1, wherein accessing the object comprises accessing a primitive at a geometry back-end shader, and wherein culling the object comprises culling the primitive so that the primitive is not provided to a pixel shader that operates in image space.

4. The method of claim 1, wherein accessing the object comprises accessing at least one of a pixel scale primitive and a subpixel scale primitive produced by subdividing a higher-order primitive in a geometry shader, and wherein culling the object comprises culling the at least one of the pixel scale primitive and the subpixel scale primitive so that the at least one of the pixel scale primitive and the subpixel scale primitive are not provided to a pixel shader that operates in image space.

5. The method of claim 1, wherein accessing the at least one far-z value comprises accessing the at least one far-z value from a cache associated with the hierarchical buffer.

6. An apparatus comprising:

a memory to store far-z values for a plurality of tiles that each represent a portion of a plane of a screen for displaying a rendered image of a scene, wherein each far-z value indicates a furthest distance of a previously rendered portion of a corresponding tile from a viewpoint used to render the scene; and a graphics pipeline comprising:

a geometry front-end to shade patches that represent a portion of a model of the scene in object space, wherein the geometry front-end is to cull a patch in response to at least one far-z value at least one tile that overlaps a bounding box of the patch in a plane of the screen being smaller than a near-z value that represents a closest distance of a portion of the patch to the viewpoint, wherein the memory implements a hierarchical buffer that stores the far-z and near-z values for tiles in a hierarchy of levels, wherein tiles in a higher level of the hierarchy encompass a predetermined number of tiles in the next lower level of the hierarchy, and wherein the far-z value of a tile in the higher level of the hierarchy is equal to a largest far-z value of a plurality of far-z values of the predetermined number of tiles in the next lower level of the hierarchy that are encompassed by the tile and wherein at least one level in the hierarchical buffer has a granularity resolution corresponding to one pixel per tile.

7. The apparatus of claim 6, wherein the geometry front-end is to cull patches so that they are not provided to a tessellation engine.

8. The apparatus of claim 6, wherein the graphics pipeline further comprises:

a geometry back-end to shade primitives generated by a tessellation engine in object space; and a pixel shader that operates in image space, wherein the geometry back-end is to cull primitives so that the culled primitives are not provided to the pixel shader, and wherein the geometry back-end is to cull the primitives in response to at least one far-z value at least one tile that overlaps a bounding box of the primitive in a plane of the screen being smaller than a near-z value that represents a closest distance of a portion of the primitive to the viewpoint.

9. The apparatus of claim 8, wherein the geometry back-end is to subdivide primitives into at least one of a pixel scale primitive and a subpixel scale primitive, and wherein the geometry back-end is to cull the at least one of the pixel scale primitive and the subpixel scale primitive so that the at least one of the pixel scale primitive and the subpixel scale primitive are not provided to the pixel shader.

10. The apparatus of claim 8, wherein a target level of the hierarchy of levels is selectable based on a comparison of dimensions of the tiles in the target level and dimensions of a bounding box of a patch or a primitive.

11. The apparatus of claim 8, further comprising:

a cache for storing far-z and near-z values from the hierarchical buffer, and wherein the cache is shared by the geometry front-end, the geometry back-end, and the pixel shader.

12. A method comprising:

accessing, at a geometry front-end shader in a graphics pipeline, patches that represent portions of a model of a scene in object space;

accessing, at the geometry front-end shader, far-z values that indicate furthest distances of previously rendered portions of tiles from a viewpoint used to render the scene on a screen, wherein subsets of the tiles overlap bounding boxes of the patches in a plane of the screen;

accessing the far-z values from a hierarchical buffer that stores the far-z and near-z values for tiles in a hierarchy of levels, wherein tiles in a higher level of the hierarchy encompass a predetermined number of tiles in the next lower level of the hierarchy, and wherein the far-z value of a tile in the higher level of the hierarchy is equal to a largest far-z value of a plurality of far-z values of the predetermined number of tiles in the next lower level of the hierarchy that are encompassed by the tile and wherein at least one level in the hierarchical buffer has a granularity resolution corresponding to one pixel per tile; and selectively culling, at the geometry front-end shader, a subset of the patches from the graphics pipeline in response to the far-z values of a corresponding subset of the tiles being smaller than near-z values that represent closest distances of portions of the patches to the viewpoint.

13. The method of claim 12, further comprising:

providing patches that are not in the culled subset of patches to a tessellation engine in the graphics pipeline;

generating primitives at the tessellation engine based on the provided patches; and providing the primitives to a geometry back-end shader.

14. The method of claim 13, further comprising:

selectively culling a subset of the primitives in response to the far-z values of a corresponding subset of the tiles being smaller than near-z values that represent closest distances of portions of the subset of the primitives to the viewpoint.

15. The method of claim 14, further comprising:

subdividing primitives that are not in the culled subset of primitives to form at least one of pixel scale primitives and subpixel scale primitives; and selectively culling the at least one of the pixel scale primitives and the subpixel scale primitives in response to the far-z values of a corresponding subset of the tiles being smaller than near-z values that represent closest distances of portions of the at least one of the pixel scale primitives and the subpixel scale primitives to the viewpoint.

16. The method of claim 15, further comprising:

selecting a target level of the hierarchy of levels for culling based on a comparison of dimensions of the tiles in the target level and dimensions of the bounding boxes of the patches, the primitives, and the at least one of the pixel scale primitives and the subpixel scale primitives, and wherein accessing far-z values comprises accessing at least one far-z value of at least one of the tiles in the target level that overlap the bounding boxes.

* * * * *